United States Patent [19]
Blomgren, Sr. et al.

[11] 3,716,171
[45] Feb. 13, 1973

[54] AIRLESS HYDRAULIC SYSTEM SUPPLY

[75] Inventors: Oscar C. Blomgren, Sr.; Oscar C. Blomgren, Jr., both of North Chicago, Ill.

[73] Assignee: Tuxco Corporation

[22] Filed: Feb. 19, 1971

[21] Appl. No.: 116,839

[52] U.S. Cl. ................................222/396, 222/530
[51] Int. Cl. ..............................................B67d 5/54
[58] Field of Search...222/394, 406, 407, 386.5, 396, 222/530

[56] References Cited

UNITED STATES PATENTS

| | | |
|---|---|---|
| 2,735,589 | 2/1956 | Milster et al. ...................222/386.5 |
| 3,368,683 | 2/1968 | Rak ...............................222/386.5 X |
| 3,494,513 | 2/1970 | Bauer.............................222/386.5 |
| 2,865,541 | 12/1958 | Hicks ............................222/386.5 |

Primary Examiner—Stanley H. Tollberg
Attorney—Mann, Brown, McWilliams & Bradway

[57] ABSTRACT

A brake fluid supply vessel with a pressurizable expansible bladder therein for expelling fluid through the bottom of the vessel. Vents communicate with the bladder and the tank around the bladder to allow exhaustion of air therefrom.

16 Claims, 8 Drawing Figures

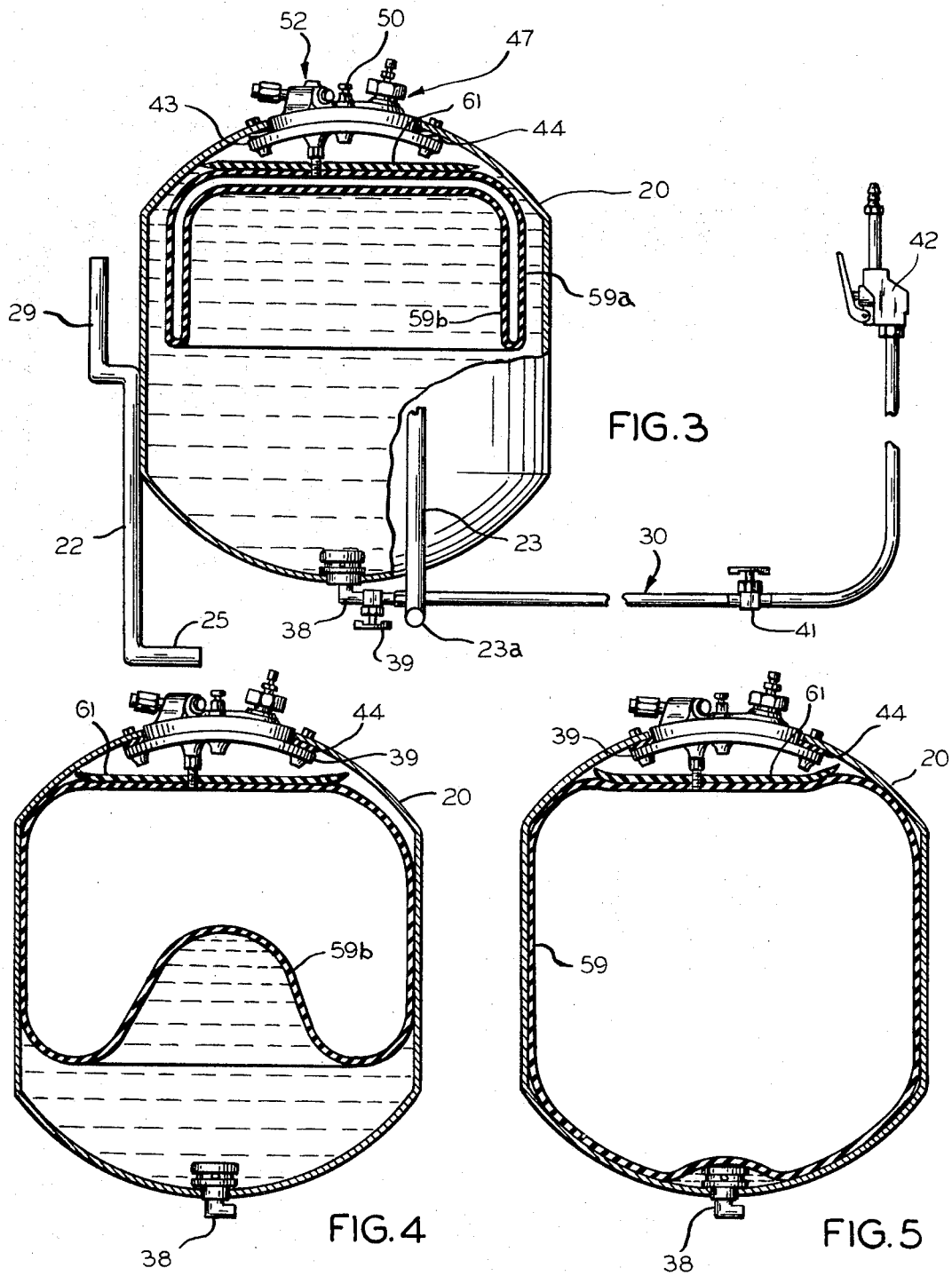

PATENTED FEB 13 1973

INVENTORS
OSCAR C. BLOMGREN, JR.
OSCAR C. BLOMGREN, SR.

BY Manny Brown McWilliam & Bradway
ATTORNEYS

AIRLESS HYDRAULIC SYSTEM SUPPLY

The present invention is directed to new and useful improvements in hydraulic brake systems fluid supply reservoirs for charging brake systems with fluid.

In recent years, some hydraulic brake fluid dispensers have taken the form of a tank within which the hydraulic brake fluid is introduced while a source of compressed air is utilized to expel the fluid from the tank and into a brake system. In one form of such apparatus, a container was filled with brake fluid and a source of compressed air coupled to the tank so as to expel the fluid out of the tank. In this type of apparatus, air was in direct contact with the hydraulic fluid. Temperature changes could cause condensation of water within the tank which, when mixed with the brake fluid, could cause brake failure. Also, compressed air could be blown into the hydraulic brake system which is undesirable. Because of this, it was proposed to form a tank of two parts with a flexible rubber diaphragm spanning the two parts and dividing the tank into an air chamber and an hydraulic fluid chamber. Air was then introduced into the air side of the tank to expel the fluid through expansion of the diaphragm against the fluid. In this type of apparatus, the diaphragm was clamped between flanges of the two tank sections. This meant that the diaphragm was compressed in order to form a seal between the two sections. This caused excessive working and wear of the diaphragm with the result that the diaphragm could rupture and allow air to escape into the hydraulic brake system.

With the foregoing in mind, the major purposes of the present invention are to form an air pressure operated brake fluid supply tank in such a manner that an expansible element within the tank is protected against stresses or abrasions, to so form a unit of this class that the system is effectively sealed against air leakage into the brake fluid, to form a unit of this class which allows all working parts to be easily removed from the tank for cleaning, inspection and repair, to form a unit of this class with an access opening seal which becomes tightened as pressure is increased within the tank, to form a system of this class in a manner such that air leaks and water condensation within the tank are substantially eliminated, and to form a unit of this class so that it is relatively simple to manufacture and use.

These and other purposes will appear from time to time in the course of the ensuing specification and claims when taken with the accompanying drawings, in which:

FIG. 3 is a sectional view of the reservoir illustrated in FIG. 1;

FIG. 4 is a sectional view similar to FIG. 3, while illustrating a different operative position (partly expanded bladder) of the parts from that shown in FIG. 3;

FIG. 5 is a sectional view similar to FIGS. 3 and 4 while illustrating a fully expanded condition of the bladder of the assembly of FIGS. 3 and 4;

Like elements are designated by like characters throughout the specification and drawings.

Figure 1:
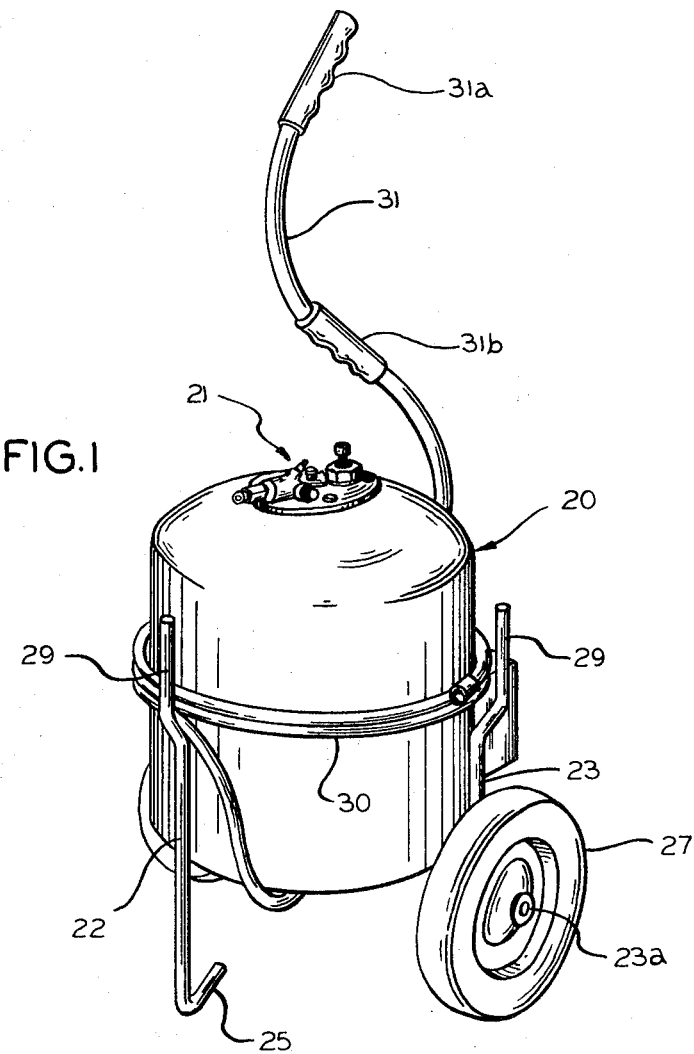
FIG. 1 is a perspective view of a typical portable brake fluid reservoir embodying the present invention.
Figure 2:
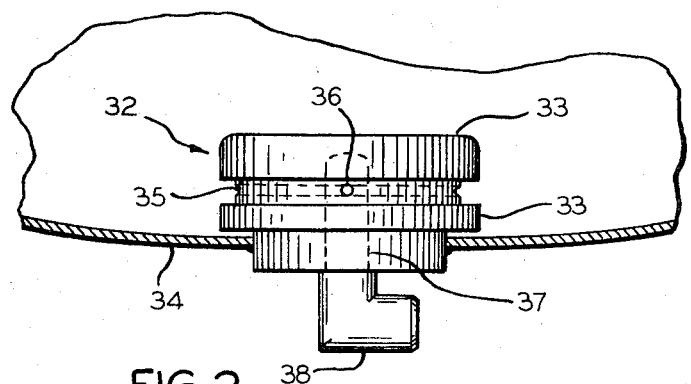
FIG. 2 is a sectional view of an outlet from the bottom of the reservoir illustrated in FIG. 1.
Figure 7:
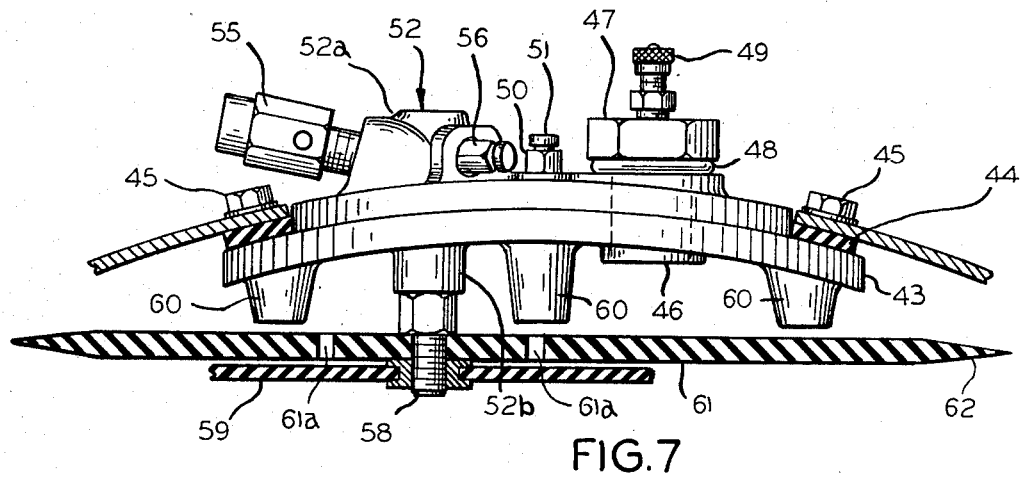
FIG. 7 is a side view of the elements illustrated in FIG. 6, while illustrating their relation to certain other elements in the assembly.
Figure 6:
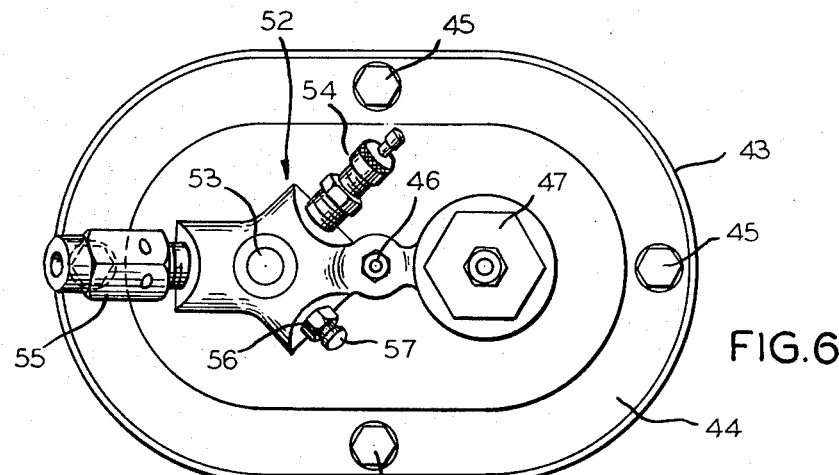
FIG. 6 is a plan view of certain portions of the assembly illustrated in FIGS. 3–5.
Figure 8:
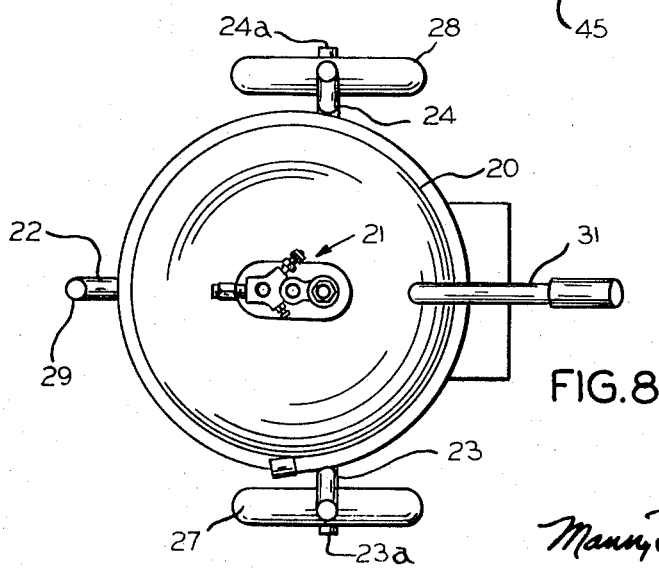
FIG. 8 is a plan view of the assembly as illustrated in FIG. 1.

With particular reference now to the drawings, and in the first instance to FIG. 1, the numeral 20 generally designates a brake fluid reservoir in the form of a general cylindrical tank having a dome-shaped top and bottom. The tank may be conveniently fabricated by making the tank in upper and lower half sections, while welding the sections at the dividing line to provide a closed vessel. The tank includes an access opening in the top wall thereof, which is covered by a cover assembly generally designated at 21. The tank is preferably formed as a portable assembly. For the purposes of portability, support rods 22, 23 and 24 (FIG. 8) may be spaced equidistantly around the axis of the tank and welded to the lower portion of the tank. Each rod includes a portion extending below the bottom wall of the tank to serve as a support for the tank. One rod, as for example, rod 22, may include an angularly bent lower portion 25 which extends toward the axis of the tank to serve as a support stand. The other rods 23 and 24 may include lower portions 23a and 24a extending at right angles to a fore and aft vertical plane through the tank to serve as axles for transport wheels 27 and 28 (FIG. 8). Rod 22 and a portion of rod 23 are seen in FIG. 3.

Each of the rods 22, 23 and 24 may include upper offset portions 29, which are spaced from the wall of the tank to define a wrap-around support area for an operating hose 30, which may be wound about the tank as shown in FIG. 1 for purposes of storage. A manipulating handle 31 may be welded to the exterior of the tank at a point between the wheels 27 and 28 to allow the tank to be tilted about the axis of the wheels to raise the stand defined by the offset 25 above the ground, whereupon the assembly may be easily wheeled to any desired location of use.

Handle 31 may have a hand grip 31a on its upper end to facilitate wheeled movement and a hand grip 31b intermediate its ends to facilitate lifting and bodily transport of the unit.

The cover assembly 21 is provided with certain valves and ports to allow the tank to be filled with hydraulic brake fluid in a manner which will be described. The bottom of the tank is provided with an outlet in the form of a plug of metal generally designated at 32 which is seated within an opening in the bottom wall 34 of the tank and welded thereto so as to seal the opening around the plug. The plug 32 includes an upwardly convex top surface 33 and a cylindrical side surface having an annular groove 35 milled therein. Apertures 36 are drilled into the wall of the groove at spaced points about the axis of the plug to provide communication between the interior of the tank and a axial bore 37 within the plug, which affords communication through an elbow fitting 38 with a shut-off valve 39 of the fluid supply hose 30. Hose 30 may include an additional shut-off valve 41 in the length thereof and terminate in a nozzle fitting 42, which is formed and adapted for coupling to an inlet fitting for a brake fluid supply system.

In accordance with the invention, the cover assembly 21 includes a closure plate in the form of a generally oval plate 43, which is slightly larger than the oval access opening in the top wall of the tank. The closure plate 43 is adapted to be inserted within the access opening and then sealed against the inner wall of the tank around the opening by means of a gasket 44 which is compressed between the cover plate 43 and the wall of the tank around the opening. Cap screws 45 are passed through the wall of the tank around the access opening and into the closure plate 43 so as to bring the plate 43 into a tightly sealed relation to the upper wall of the tank around the access opening.

The closure plate 43 includes a brake fluid filler opening 46 therein, which is adapted to be closed and sealed by a cap 47, which is screw threaded into the opening and which bears against a sealing gasket 48. The cap 47 includes a spring closed air inlet valve 49, which projects above the cap and which may be coupled to an air supply hose for the purpose of pressurizing the interior of the tank to collapse the bladder prior to filling the tank.

The central portion of the closure plate 43 is provided with a spring closed vent valve fitting 50 having a manually operated button 51 for opening the interior of the tank to atmospheric pressure, upon depression of the button for purposes which will be described. The closure plate 43 also carries an air fitting generally designated at 52 on the side of the closure plate opposite to the filler opening side. The fitting is formed as bosses 52a and 52b cast integrally with the plate and projecting above and below the plate. The air inlet fitting 52 includes a central bore 53 extending through the bosses and plate. The top of the bore is closed by an air gauge (not shown). Upper boss 52a has transverse threaded bores communicating with bore 53 and receiving an air inlet valve 54, a pressure relief valve 55 and a vent valve 56. Valve 54 is of the spring closed type. Vent valve 56 is a spring closed valve and includes an actuating button 57 which, upon depression thereof, opens the valve for communication of the bore 53 to the atmosphere.

Manually actuated spring closed vent valves are known to the art and for this reason the valves 50 and 56 are not described in detail herein. Similarly, the air inlet valves 49 and 54 are of a type known to the art, such as air inlet valves for automotive tires and for this reason they are not described in detail herein.

Pressure relief valve 55 is set to open when a preselected maximum bladder pressure is exceeded. In further accordance with the invention, connection 58 couples a bladder 59 to the boss 52b. Bladder 59 is a molded rubber construction which, in the unexpanded condition thereof, has a generally inverted cup-shaped form as is seen in FIG. 3. In the unexpanded condition, the bladder consists of an outer wall 59a defined by the upper part of the bladder and an inner wall 59b which consists of the lower portion of the bladder, which is folded upwardly within the upper portion 59a to define the cup-shaped form. Bladder 59 is formed from a flexible material and preferably a fabricated material comprised of an inner nylon plastic sheet with an outer coating of Buena N rubber. Bladder 59 is adapted to be expanded form the position illustrated in FIG. 3 by pressurizing the interior thereof through the air fitting 54 so that it moves from the condition illustrated in FIG. 3 to a partially expanded condition, which is generally represented in FIG. 4 and a fully expanded condition as illustrated in FIG. 5, wherein the bladder may fill approximately 80 to 90 percent of the volume of the tank's interior.

In further accordance with the invention, the lower portion of the closure plate 43 is provided with posts 60 which are spaced around the circumference thereof and project downwardly a short distance past the boss 52b. The posts 60 receive the ends of the screws 45. An elastomeric protective disc 61 is fitted around the fitting 58 between boss 52b and the bladder 59. The disc 61 has a diameter such as to extend beyond the outline of the cover plate to prevent the bladder from moving upwardly against any part of the closure plate, and thus protect the bladder member from abrasions and possible rupture. The disc 61 includes an annular marginal taped edge 62, which may flex upwardly in response to a pressurized condition of the bladder for purposes of forming a circular closure around the plate 43 and against the inner wall of the tank. Disc 61 may be provided with small apertures to allow equalization of pressure on opposite sides of the disc. For example, four 3/16 inch holes may be formed through the disc and spaced equidistantly around connection 58.

In operation the bladder fills approximately 80 percent to 90 percent of the volume of the tank when it is fully expanded. At the end of a brake filling operation, the remainder of the volume of the tank contains brake fluid. The tank volume may be approximately 5 gallons in a typical embodiment of the invention.

To recharge the unit, the vent valve 56 of the bladder air fitting is actuated to release air from the bladder. At the same time, the vent valve 50 for the fluid side of the tank is opened so that the fluid side of the tank is open to atmospheric pressure also. This collapses the bladder 59. To insure complete collapse of the bladder, an air hose is coupled to the air inlet valve 59 of the filler cap and the vent valve 56 of the bladder air inlet fitting is opened to cause the bladder to assume the inverted cup-shaped form as appears in FIG. 3. The tank is then ready to be recharged with hydraulic brake fluid. The filler cap 47 is then removed and a charge of brake fluid approximating the volume of the tank is introduced through the filler cap opening. At this time some air remains within the tank. The filler cap is then replaced and sealed tightly in the filler opening. An air hose for the bladder inlet valve 54 is then used to partially pressurize the bladder. At the same time the vent valve 50 for the hydraulic side of the tank is opened and kept open so that any air remaining within the tank may be exhausted through the opening of this valve. When air has been completely exhausted from the interior of the tank, brake fluid will flow from the vent valve opening at which time the vent valve 50 may be closed. The tank is then ready for another brake system charging cycle. The air valve 54 for the bladder may then be closed, if desired.

At this time, the bladder may be expanded approximately 20 percent so that the total volume in the tank consists of the partially expanded bladder and a volume of brake fluid filling the remainder of the interior of the tank.

When it is desired to charge a brake system, the hose 30 is coupled to the brake system supply line and the air inlet valve 54 coupled to an air hose so as to again subject the bladder to air pressure and cause it to fully expand. As the bladder expands, it expels the hydraulic brake fluid through the outlet plug 32 in the bottom of the tank. When the bladder is fully expanded, the bottom of the bladder forms a seal around the outlet opening by contacting the fluid on the lower wall of the tank around the outlet opening and pressing it against the wall.

As the bladder approaches its fully expanded condition, it forces the edge of protective disc 61 upwardly. The outer annular edge 62 of the disc may be forced upwardly into a contacting relation with the upper wall of the tank around the closure plate 43.

When the bladder is fully expanded and the substantial part of the brake fluid within the tank is supplied through the hose 30 to a brake system or systems being recharged, valve 39 in the fluid supply line may be closed, whereupon the bladder may be collapsed in the manner previously mentioned and the tank refilled.

It should be understood that the system may be utilized for discharging substantially all of the brake fluid within the tank in one operation, or may be utilized for discharging small amounts of brake fluid at a time until the bladder is completely expanded and the substantial part of the brake fluid discharged from the tank.

The expansible bladder is protected against abrasives and unnecessary wear. As formed, the assembly minimizes the possibility of air in the brake system. The seal around the access opening becomes tighter as the pressure in the tank increases. The pressure force from the air in the interior of the bladder is equalized by the pressure forces from the fluid exterior to the bladder. The cover assembly is so formed that it, together with the bladder and disc, are easily removed from the tank for service and cleaning.

I claim:

1. A hydraulic system supply vessel for supplying air free hydraulic fluid to a hydraulic system, including a tank adapted to contain a supply of hydraulic fluid, said tank having an outlet opening formed in a bottom wall thereof, said opening including a fitting adapted to be coupled to a hydraulic fluid supply line, said tank having an access opening in the top wall thereof with a closure fitted within the opening and sealed to the wall of said tank around said opening, an air inlet fitting formed in said closure and an expansible hollow bladder carried by said closure within said tank and coupled to said air inlet fitting, the interior of said bladder being in communication solely with said air inlet fitting, said closure having a normally closed filler opening therein for filling said tank with hydraulic fluid, said air inlet adapted to be coupled to a source of air pressure whereby air may expand said bladder against a volume of fluid within said tank and force fluid out of said outlet opening, and a flexible disc of elastomeric material formed around said air inlet fitting above said bladder and underlying said closure, said disc having an area greater than the area of said closure.

2. The structure of claim 1 wherein said bladder has a generally inverted cup-shaped form in the unexpanded condition thereof and has a size such as to be expanded into a generally cylindrical form of a volume comprising a substantial portion of the volume of said tank.

3. The structure of claim 1 wherein said filler opening includes a closure cap therefor, said cap having an air inlet fitting for the purpose of pressurizing the interior of the tank with air in the absence of fluid to force said bladder into its unexpanded, inverted, cup-shaped form.

4. The structure of claim 1 wherein said closure includes a manually actuated valve to allow release of air and fluid through said closure when said tank is filled with fluid.

5. The structure of claim 1 wherein said air inlet fitting has a bore therein and said closure carries a pressure relief valve, a normally closed, manually actuated vent valve and a normally closed air inlet valve communicating with said bore at a location exterior to said tank.

6. The structure of claim 1 wherein said closure is defined by a plate adapted to be received within an access opening of matching configuration in the top wall of the tank, the area of said plate being larger than the area of said access opening and being shaped so that the said plate may be received through said access opening with the marginal area thereof underlying the marginal area of said tank around said access opening, and sealing means between said marginal areas.

7. The structure of claim 1 wherein said outlet opening in said tank is formed through an upwardly convex element positioned above the lower wall of said tank, said element having a central bore communicating with said fitting, said element having a reduced portion underlying said upwardly concave part, said reduced portion having passage means therein and communicating with said bore to allow flow of fluid from said tank and through said bore into said fitting.

8. The structure of claim 7 wherein said bladder is adapted upon expansion thereof to move against said upwardly concave part and therearound.

9. A liquid supply vessel for supplying air free liquid through a supply hose, including a tank adapted to contain a supply of liquid, said tank having an outlet opening formed in a bottom wall thereof, said opening including a fitting adapted to be coupled to a liquid supply hose, said tank including means for developing pressure therein against a volume of liquid therein for expelling liquid through said opening, said tank having a plurality of support rods spaced around said tank and fixed to the wall thereof, the major portion of the length of each rod extending generally vertically, the uppermost portions of each rod being offset outwardly from the wall of said tank to define a hose receiving storage area between the wall of the tank and said portions, the lower ends of a pair of said rods being extended laterally outwardly from said tank in alignment with one another, and support wheels rotatably carried on said lower laterally extended portions of said pair of rods.

10 The structure of claim 9 wherein a rod other than said pair includes a laterally offset portion serving as a stand.

11. A hydraulic system supply vessel for supplying air free fluid to an hydraulic system, including a tank adapted to contain a supply of hydraulic fluid, said tank having an outlet opening formed in the bottom wall thereof, said opening including a fitting adapted to be coupled to a hydraulic fluid supply line, said tank having an air fitting and a filler fitting in the wall thereof, an expansible hollow air bladder within said tank and coupled to said air fitting, the interior of said bladder being in communication solely with said air inlet fitting, said filler fitting including a normally closed air inlet valve to provide a pressurized condition in the fluid volume of said tank around said bladder, said tank including a normally closed and manually operated vent valve communicating with the fluid volume of said tank around said bladder, said air inlet fitting including a normally closed and manually actuated vent valve adapted to communicate the interior of said bladder to the atmosphere, said air inlet fitting including a normally closed air inlet valve providing a means for pressurizing the interior of said bladder.

12. The structure of claim 11 wherein said air inlet fitting includes a pressure relief valve for limiting the maximum pressure within said bladder.

13. The structure of claim 11 wherein said bladder, fittings and valves are carried by a closure plate removably sealed across an access opening to said tank.

14. A liquid supply vessel for supplying air free liquid to a supply line, including a tank adapted to contain a liquid, said tank having an outlet opening formed in the bottom wall thereof, said opening including a fitting adapted to be coupled to a liquid supply line, said tank having an air fitting and a filler fitting in the wall thereof, an expansible hollow air bladder within said tank and coupled to said air fitting, the interior of said bladder being in communication solely with said air inlet fitting, said filler fitting including a normally closed air inlet valve to provide a pressurized condition in the fluid volume of said tank around said bladder, said tank including a normally closed and manually operated vent valve communicating with the fluid volume of said tank around said bladder, said air inlet fitting including a normally closed and manually actuated vent valve adapted to communicate the interior of said bladder to the atmosphere, said air inlet fitting also including a normally closed air inlet valve providing a means for pressurizing the interior of said bladder.

15. The structure of claim 14 wherein said air inlet fitting includes a pressure relief valve for limiting the maximum pressure within said bladder.

16. The structure of claim 14 wherein said bladder, fittings and valves are carried by a closure plate removably sealed across an access opening in said tank.

* * * * *